United States Patent
Mizuno et al.

(10) Patent No.: US 7,797,266 B2
(45) Date of Patent: Sep. 14, 2010

(54) VEHICLE INFORMATION PROCESSING SYSTEM FOR CONTENT RECOMMENDATION USING BAYESIAN NETWORK MODELS

(75) Inventors: Nobuhiro Mizuno, Tokyo (JP); Hirotoshi Iwasaki, Tokyo (JP); Yoichi Motomura, Tokyo (JP)

(73) Assignee: Denso IT Laboratory, Inc., Tokyo (JP)

( * ) Notice: Subject to any disclaimer, the term of this patent is extended or adjusted under 35 U.S.C. 154(b) by 276 days.

(21) Appl. No.: 10/593,065

(22) PCT Filed: Mar. 7, 2005

(86) PCT No.: PCT/JP2005/003916

§ 371 (c)(1),
(2), (4) Date: Jul. 30, 2007

(87) PCT Pub. No.: WO2005/091214

PCT Pub. Date: Sep. 29, 2005

(65) Prior Publication Data

US 2007/0288413 A1    Dec. 13, 2007

(30) Foreign Application Priority Data

Mar. 18, 2004    (JP) .............................. 2004-079026

(51) Int. Cl.
*G06F 17/00* (2006.01)
*G06N 5/02* (2006.01)
(52) U.S. Cl. ...................................................... 706/46
(58) Field of Classification Search .................... 706/46
See application file for complete search history.

(56) References Cited

U.S. PATENT DOCUMENTS 7,254,747 B2 *   8/2007   Osborn et al. .................. 714/37

(Continued)

FOREIGN PATENT DOCUMENTS

JP          2000-99441           4/2000

(Continued)

OTHER PUBLICATIONS

Raftery et al. "Using Bayesian Model Averaging to Calibrate Forecast Ensembles", Monthly Weather Review 133 (2005), pp. 1-32.*

(Continued)

*Primary Examiner*—Donald Sparks
*Assistant Examiner*—Li-Wu Chang
(74) *Attorney, Agent, or Firm*—Finnegan, Henderson, Farabow, Garrett & Dunner LLP

(57) ABSTRACT

An information processing system includes a content providing device (20) providing content appropriate for a user. The content providing device (20) includes: a model storage unit (40) containing a plurality of different models depending on the user attribute; a model determining unit (34) for selecting a model corresponding to the user attribute from the models stored in the model storage unit (40); a Bayesian reasoning unit (30) for reading out the model determined by the model determining unit (34) from the model storage unit (40) and using the read-out model to obtain the content appropriate for the user through probabilistic reasoning; and a recommending unit (22) for recommending the content obtained by the Bayesian reasoning unit (30) to the user. The content providing device (20) further includes a Bayesian learning unit (32) for learning models by using a user response to the content received from an operating unit (24).

5 Claims, 13 Drawing Sheets

U.S. PATENT DOCUMENTS

| | | | |
|---|---|---|---|
| 2001/0008404 | A1 | 7/2001 | Naito et al. |
| 2002/0087540 | A1 | 7/2002 | Ashida et al. |
| 2002/0091908 | A1 | 7/2002 | Ashida et al. |
| 2003/0018600 | A1* | 1/2003 | Jammu .................. 706/16 |
| 2003/0114968 | A1 | 6/2003 | Sato et al. |
| 2004/0076936 | A1* | 4/2004 | Horvitz et al. ............. 434/236 |

FOREIGN PATENT DOCUMENTS

| | | |
|---|---|---|
| JP | 2002-189597 | 7/2002 |
| JP | 2002-244947 | 8/2002 |

OTHER PUBLICATIONS

Friedman et al. "Sequential Update of Bayesian Network Structure", UAI'97, pp. 1-10.*

Yoichi Motomura, "Bayesian Net Software", Transactions of the Japanese Society of Artificial Intelligence, vol. 17, No. 5, (2002), pp. 1-6.

Ryutaro Ichise, et al., "Adaptive User Interfaces and Conversational Interaction", Transactions of the Japanese Society for Artificial Intelligence, vol. 17, No. 3, (2002), pp. 291-294.

Masanori Sugimoto, "User Modeling and Adaptive Interaction in Information Gathering Systems", Transactions of the Japanese Society for Artificial Intelligence, vol. 14, No. 1, (1999), pp. 25-32.

Kazuyuki Samejima et al., "Symbolization and Imitation Learning of Motion Sequence Using Competitive Modules", The transactions of the Institute of Electronics, Information and Communication Engineers, vol. J85-D-II, No. 1, pp. 90-100.

Notification of Reasons for Rejection in counterpart Japanese Patent Application No. 2006-511153 prepared by the Japanese Patent Office on Apr. 6, 2010 (3 pages), Partial.

Youichi Motomura, "Bayesian Networks," Technical Report of The Institute of Electronics, Information and Communication Engineers, Jul. 22, 2003, vol. 103, No. 228, pp. 25-30, Abstract.

Communication from German Patent Office in counterpart application No. 11 2005 000613.1 dated Mar. 30, 2010 (5 pages).

Ipke Wachsmuth, *Expert Agent System Technologies for More Intuitive User Interfaces*, University of Bielefeld, Informatics in Sport, 1998, pp. 181 to 191 (11 pages), Summary.

Alice Agogino et al., *Intelligent Sensor Validation and Sensor Fusion for Reliability and Safety Enhancement in Vehicle Control*, Final Report PATH Project MOU-132, Jun. 30, 1995 (pp. 1-56).

* cited by examiner

| SONG TITLE | GENRE | RANKING | SONG DATA |
|---|---|---|---|
| AAA | CLASSIC | 8 | songaaa.wav |
| BBB | ROCK | 3 | songbbb.wav |
| ... | ... | ... | ... |

FIG. 3

| APPLICATION MODEL | LEARNING MODEL |
|---|---|
| MODEL A | MODEL A |
|  | MODEL C |
| MODEL B | MODEL B |
|  | MODEL C |
| MODEL C | MODEL C |

FIG. 5

| APPLICATION MODEL | LEARNING MODEL | REFLECTION PARAMETER |
|---|---|---|
| MODEL A | MODEL A | 1 |
| | MODEL C | 0.2 |
| MODEL B | MODEL B | 1 |
| | MODEL C | 0.8 |
| MODEL C | MODEL C | 1 |

VEHICLE INFORMATION PROCESSING SYSTEM FOR CONTENT RECOMMENDATION USING BAYESIAN NETWORK MODELS

TECHNICAL FIELD

The present invention relates to a vehicle information processing system for using a Bayesian network model to provide an appropriate recommendation to a recipient who receives the recommendation.

BACKGROUND ART

With today's dramatic expansion of the application range of information technology, it has become necessary to deal with uncertain and inexplicit information that had been hard for computers to process. For example, consider a recommendation system for Internet shopping, in which customer needs are read out from previous transaction history or customer management information, and the most appropriate information is recommended to a customer concerned. Although a customer list may be searched for the closest purchase pattern for the customer concerned, not all customers of the same age and sex necessarily have the same preferences. Also, a customer does not necessarily keeps on having the same preferences as those answered in a questionnaire submitted by the customer at the time of registration. Therefore, it becomes necessary to predict the preferences by comprehensive judgment from the customer's actions (e.g., WWW browsing history), attributes, and questionnaire information. However, this does not always result in a single answer. There may be a plurality of recommendation candidates at the same time. In addition, these candidates are naturally treated as having vagueness and uncertainty, such as "judging from the previously browsed WWW pages, the user is likely to have an interest in football-related information."

For these problems, a probabilistic framework is effective. A plurality of candidates may each be assigned the degree of certainty, such as the likelihood of having an interest in football-related items being 60% and the likelihood of having an interest in travel being 30%, so that the candidates may be treated with uncertainty. If the previously viewed page was a page about Korea for example, the probability of interest may be calculated for each of the World Cup football-related information, travel-related information, and cooking-related information. Then, information with the highest probability that the customer concerned has an interest therein may be provided. To calculate this probability, many different factors (e.g., a hobby answered in a questionnaire) may be taken into consideration to utilize the dependencies between them (e.g., if the hobby is sport, it is likely that football is of interest). In this manner, more accurate prediction is possible.

As an information processing model for calculating the probability based on such dependencies between a plurality of factors, the Bayesian network has been attracting attention in various fields recently. The Bayesian network is a network-shaped probability model defined by the following three items: (1) random variables, (2) conditioned dependencies between the random variables, and (3) their conditional probability. The item (1) is represented by nodes, and (2) is represented by directed links established between the nodes. A node to which a link is directed is called a child node, and a node from which a link originates is called a parent node. The item (3) is a conditional probability that a child node has a certain value when its parent nodes have certain values. For discrete variables, this is expressed in the form of a table (a conditional probability table) that lists respective probability values for all states that the child node and the parent nodes assume, such as P (child node=y|parent nodes=x1, x2, . . . )=p. (Yoich Motomura, "Bayesian Net Software", Transactions of the Japanese Society for Artificial Intelligence, Vol. 17, No. 5, a (2002))

The above-described recommendation system may be implemented using the Bayesian network. Specifically, the relationships between attributes etc. of customers and objects of high interest of the customers are represented as a Bayesian network model based on statistical data, such as a questionnaire research result and purchase history obtained from a large number of customers varying in age, sex, lifestyle, and so forth. Then, the Bayesian network model is used to reason out an object of high interest of a customer from the customer's attributes and the situation, and the object of high interest is recommended to the customer based on the reasoning result.

In this recommendation system, the Bayesian network model is generated based on the statistical data obtained from various customers. Therefore, it is considered that the conditions for determining the object to be recommended, such as the customer attributes and the situation, have a small influence on the recommendation. For example, if the condition for determining the object to be recommended is "customer's attribute: father", data obtained from customers having the attribute "father" is part of the entire statistical data from which the Bayesian network model was generated. The influence of the condition "father" on the model is therefore smaller than that on a model generated based on statistical data obtained only from customers having the attribute "father." Studies are currently proceeding to sufficiently reflect conditions for determining the recommendation object in the recommendation result and to make more accurate recommendation.

In the light of the above-described background, the present invention aims to provide a vehicle information processing system that allows more appropriately obtaining a recommendation to be provided to a recipient who receives the recommendation.

DISCLOSURE OF THE INVENTION

A vehicle information processing system of the present invention is a vehicle information processing system for using a Bayesian network model to provide a probabilistically appropriate recommendation to a recipient who receives the recommendation, the recipient being an occupant. The system comprises: a model storage unit containing a plurality of different Bayesian network models depending on the recommendation-condition, wherein the recommendation-condition is a condition on the recipient side who receives a recommendation; a model determining unit for determining a model corresponding to the recommendation-condition as an application model from the models stored in the model storage unit; a reasoning unit for reading out the application model determined by the model determining unit from the model storage unit and for obtaining a recommendation through probabilistic reasoning that uses the read-out application model; and a recommending unit for providing the recommendation obtained by the reasoning unit to the recipient.

In the vehicle information processing system of the present invention, the model storage unit may contain a plurality of different Bayesian network models depending on the attribute of the recipient, and the model determining unit may determine a model corresponding to the attribute of the recipient as the application model. Also, the model storage unit may contain a plurality of different Bayesian network models depending on the situation in which the recommendation is provided, and the model determining unit may determine a model corresponding to the situation in which the recommendation is provided as the application model.

The vehicle information processing system of the present invention may comprise a select-model storage unit containing a select-model applied to probabilistic reasoning for determining the application model from the models based on the attribute of the recipient and the situation in which the recommendation is provided. The model determining unit may determine the application model through the probabilistic reasoning that uses the select-model read out from the select-model storage unit, based on the attribute of the recipient and the situation in which the recommendation is provided.

The vehicle information processing system of the present invention may comprise: a response receiving unit for receiving a response made by the recipient when the recommending unit provides the recommendation obtained by the reasoning unit from the application model; and a model learning unit for learning models stored in the model storage unit using the response received by the response receiving unit and for updating the models to models specialized for each recommendation-condition.

The vehicle information processing system of the present invention may comprise a learning model information storage unit containing the learning models in association with the application model applied to the probabilistic reasoning in the reasoning unit, wherein the learning models comprises, among the models stored in the model storage unit, a model identical with the application model and a different model influenced by the result of the reasoning that uses the application model. The model learning unit may learn models using the response received by the response receiving unit, wherein the models are associated with the application model as the learning models in the learning model information storage unit. The learning model information storage unit may contain reflection parameters indicating the degree to which the response is reflected in learning of the learning models, wherein each reflection parameter may be set for each of a plurality of learning models corresponding to one application model. The model learning unit may perform learning processing such that a reflection parameter associated with a learning model to be learned is read out from the learning model information storage unit and the response is reflected in the learning model to the degree according to the read-out reflection parameter.

The vehicle information processing system of the present invention may comprise a learning data obtaining unit for obtaining learning data used in learning by which the models specialized for each recommendation-condition through the learning by the model learning unit is brought closer to a general model. The model learning unit may use the learning data obtained by the learning data obtaining unit to learn models stored in the model storage unit. The system may also comprise a learning reflection parameter storage unit containing learning reflection parameters indicating the degree to which the learning data is reflected in learning of models. The model learning unit may perform learning processing such that the learning data is reflected in learning of the models to the degree according to the learning reflection parameters read out from the learning reflection parameter storage unit.

The vehicle information processing system of the present invention may comprise: information recommending devices, each having the recommending unit; and a center device communicatively connected with the information recommending devices. The center device may collect from each information recommending device the response received from the recipient when the recommendation is provided.

A vehicle information processing system in another aspect of the present invention is a vehicle information processing system for using a reasoning algorism to reason out a recommendation appropriate for a recipient who receives the recommendation and for providing the recommendation obtained through the reasoning. The system comprises: a resource storage unit containing a plurality of different resources for calculation depending on the recommendation-condition, wherein the recommendation-condition is a condition on the recipient side who receives a recommendation; a resource determining unit for determining a resource for calculation corresponding to the recommendation-condition from the resources for calculation stored in the resource storage unit; a reasoning unit for reading out the resource for calculation determined by the resource determining unit from the resource storage unit and for obtaining a recommendation through reasoning that uses the read-out resource for calculation; and a recommending unit for providing the recommendation obtained by the reasoning unit to the recipient.

A vehicle information recommending device of the present invention is a vehicle information recommending device for using a Bayesian network model to provide a probabilistically appropriate recommendation to a recipient who receives the recommendation, the recipient being an occupant. The device comprises: a model storage unit containing a plurality of different Bayesian network models depending on the recommendation-condition, wherein the recommendation-condition is a condition on the recipient side who receives a recommendation; a model determining unit for determining a model corresponding to the recommendation-condition as an application model from the models stored in the model storage unit; a reasoning unit for reading out the application model determined by the model determining unit from the model storage unit and for obtaining a recommendation through probabilistic reasoning that uses the read-out application model; and a recommending unit for providing the recommendation obtained by the reasoning unit to the recipient. The vehicle information recommending device of the present invention may be provided in a car.

A vehicle information processing method of the present invention is a method for using a Bayesian network model to provide a probabilistically appropriate recommendation to a recipient who receives the recommendation, the recipient being an occupant. The method comprises: a model determining step of determining a model corresponding to the recommendation-condition as an application model from a plurality of different Bayesian network models depending on the recommendation-condition, wherein the recommendation-condition is a condition on the recipient side who receives a recommendation; a reasoning step of obtaining a recommendation through probabilistic reasoning that uses the application model determined in the model determining step; and a recommending step of providing the recommendation obtained in the reasoning step to the recipient.

A program of the present invention is a program for using a Bayesian network model to provide a probabilistically appropriate recommendation to a recipient who receives the recommendation, the recipient being an occupant. The program causes a computer to perform: a model determining step of determining a model corresponding to the recommendation-condition as an application model from a plurality of different Bayesian network models depending on the recommendation-condition, wherein the recommendation-condition is a condition on the recipient side who receives a recommendation; a reasoning step of obtaining a recommendation through probabilistic reasoning that uses the application model determined in the model determining step; and a recommending step of providing the recommendation obtained in the reasoning step to the recipient.

As will be described below, the present invention has other embodiments. Therefore, the above disclosure of the invention is intended to provide part of the present invention and not to limit the scope of the claimed invention.

BRIEF DESCRIPTION OF THE DRAWINGS

FIG. 3 is a diagram showing exemplary data stored in a content information storage unit in the first embodiment;

FIG. 5 is a diagram showing exemplary data stored in a learning model table storage unit in the first embodiment;

FIG. 8 is a diagram showing exemplary data stored in the learning model table storage unit in a second embodiment;

BEST MODE FOR CARRYING OUT THE INVENTION

Figure 1:
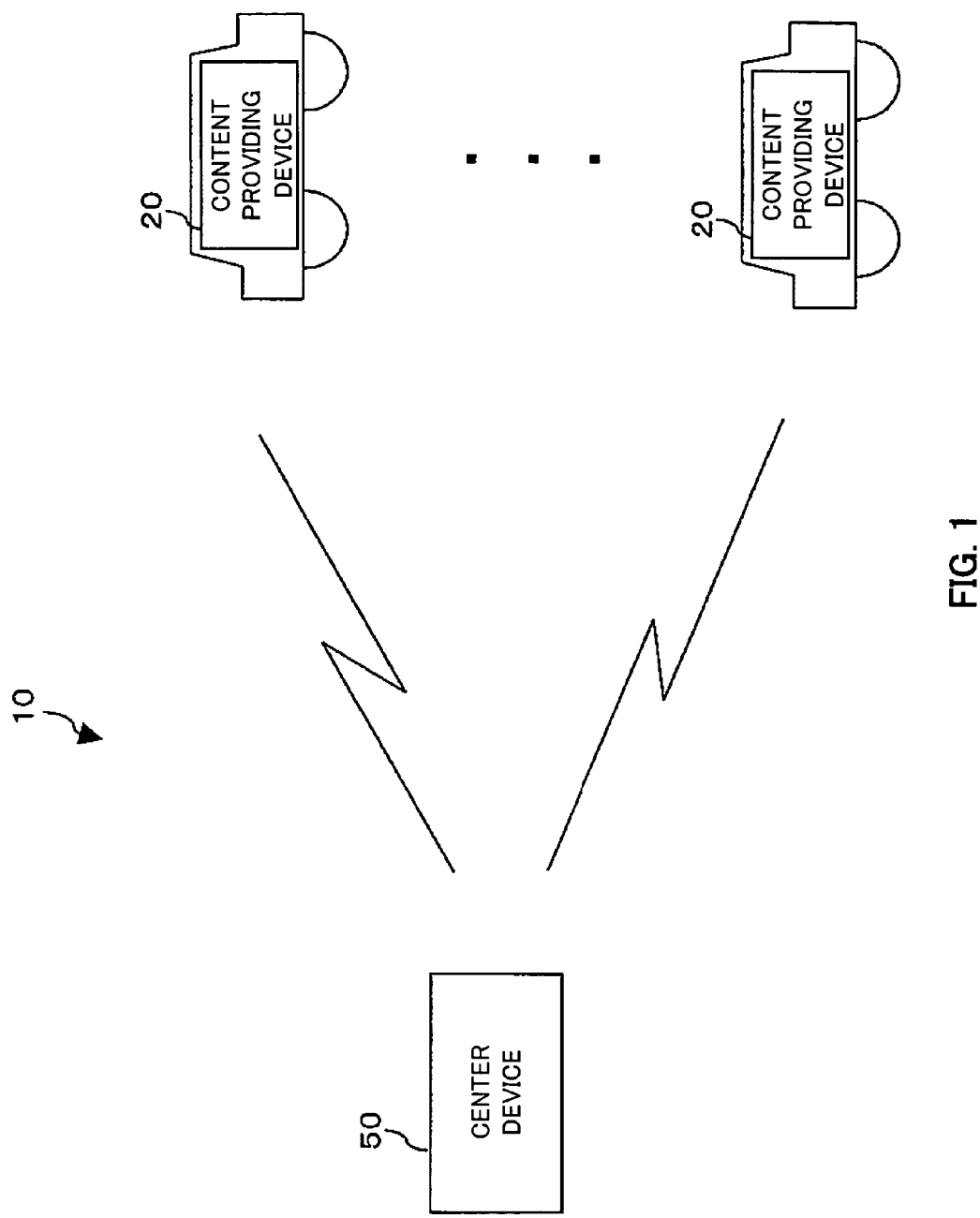
FIG. 1 is a diagram showing a configuration of an information processing system in a first embodiment.

The present invention will be described in detail below. However, the detailed description below and the appended drawings do not limit the present invention. The scope of the present invention is defined by the appended claims.

A vehicle information processing system of the embodiments is a vehicle information processing system for using a Bayesian network model to provide a probabilistically appropriate recommendation to a recipient who receives the recommendation, the recipient being an occupant. The system comprises: a model storage unit containing a plurality of different Bayesian network models depending on the recommendation-condition, wherein the recommendation-condition is a condition on the recipient side who receives a recommendation; a model determining unit for determining a model corresponding to the recommendation-condition as an application model from the models stored in the model storage unit; a reasoning unit for reading out the application model determined by the model determining unit from the model storage unit and for obtaining a recommendation through probabilistic reasoning that uses the read-out application model; and a recommending unit for providing the recommendation obtained by the reasoning unit to the recipient.

A plurality of different models depending on the recommendation-condition such as the attribute of the recipient are stored, and a model corresponding to the recommendation-condition is read out from these models and applied to probabilistic reasoning. In this manner, an appropriate recommendation can be accurately obtained under the recommendation-condition at different times.

In the vehicle information processing system, the model storage unit may contain a plurality of different Bayesian network models depending on the attribute of the recipient, and the model determining unit may determine a model corresponding to the attribute of the recipient as the application model.

In this manner, different models depending on the attribute of the recipient can be applied to the probabilistic reasoning, and an appropriate recommendation can be obtained according to the attribute of the recipient.

In the vehicle information processing system, the model storage unit may contain a plurality of different Bayesian network models depending on the situation in which the recommendation is provided, and the model determining unit may determine a model corresponding to the situation in which the recommendation is provided as the application model.

In this manner, different models depending on the situation in which the recommendation is provided can be applied to the probabilistic reasoning, and an appropriate recommendation can be obtained according to the situation in which the recommendation is provided.

The vehicle information processing system may comprise a select-model storage unit containing a select-model applied to probabilistic reasoning for determining the application model from the models based on the attribute of the recipient and the situation in which the recommendation is provided. The model determining unit may determine the application model through the probabilistic reasoning that uses the select-model read out from the select-model storage unit, based on the attribute of the recipient and the situation in which the recommendation is provided.

In this manner, by determining the application model from the models through the probabilistic reasoning that uses the select-model, an application model can be selected that allows obtaining an appropriate recommendation according to conditions such as the attribute of the recipient and the situation in which the recommendation is provided, even if a plurality of models have not been generated according to explicit variables such as the attribute of the recipient and the situation in which the recommendation is provided.

The vehicle information processing system may comprise: a response receiving unit for receiving a response made by the recipient when the recommending unit provides the recommendation obtained by the reasoning unit from the application model; and a model learning unit for learning models stored in the model storage unit using the response received by the response receiving unit and for updating the models to models specialized for each recommendation-condition.

In this manner, the models stored in the model storage unit are learned based on the response of the recipient, so that the models in the model storage unit are updated to specialized models suitable for the probabilistic reasoning under the recommendation-condition. Therefore, the models stored in the model storage unit can be used to appropriately obtain a recommendation.

The vehicle information processing system may comprise a learning model information storage unit containing the learning models in association with the application model applied to the probabilistic reasoning in the reasoning unit, wherein the learning models comprises, among the models stored in the model storage unit, a model identical with the application model and a different model influenced by the result of the reasoning that uses the application model. The model learning unit may learn models using the response received by the response receiving unit, wherein the models are associated with the application model as the learning models in the learning model information storage unit.

In this manner, the response of the recipient to the recommendation obtained from the application model can be used to appropriately learn not only the application model but also other models. Therefore, a plurality of models stored in the model storage unit can be efficiently learned.

In this vehicle information processing system, the learning model information storage unit may contain reflection parameters indicating the degree to which the response is reflected in learning of the learning models, wherein each reflection parameter may be set for each of a plurality of learning models corresponding to one application model. The model learning unit may perform learning processing such that a reflection parameter associated with a learning model to be learned is read out from the learning model information storage unit and the response is reflected in the learning model to the degree according to the read-out reflection parameter.

In this manner, since the response is reflected in the learning models to the degree according to the reflection parameters, the degree to which the model itself applied to the reasoning is reflected in that model can be made higher than the degree of reflection of other models, for example. As another example, when a learning model is associated with two different application models, the learning model can be assigned different degree of reflection for each application model. Thus, it is possible to set variable amounts of influence of the response on the models, thereby allowing appropriate model learning.

The vehicle information processing system may comprise a learning data obtaining unit for obtaining learning data used in learning by which the models specialized for each recommendation-condition through the learning by the model learning unit is brought closer to a general model. The model learning unit may use the learning data obtained by the learning data obtaining unit to learn the models stored in the model storage unit.

In this manner, aspects of the general model can be added to the specialized models suitable for the probabilistic reasoning under the recommendation-condition, so that a model can be generated that allows reasoning incorporating general preferences. Therefore, the proceeding of specialization of the models can be appropriately limited.

The vehicle information processing system may comprise a learning reflection parameter storage unit containing learning reflection parameters indicating the degree to which the learning data is reflected in learning of the models. The model learning unit may perform learning processing such that the learning data is reflected in learning of the models to the degree according to the learning reflection parameters read out from the learning reflection parameter storage unit.

In this manner, the degree to which the specialized models stored in the model storage unit are brought closer to the general model can be set.

The vehicle information processing system may comprise: information recommending devices, each having the recommending unit; and a center device communicatively connected with the information recommending devices. The center device may collect from each information recommending device the response received from the recipient when the recommendation is provided.

In this manner, since the center device collects responses received at a plurality of information recommending devices, general responses of many recipients to a recommendation can be known.

A vehicle information processing system in another aspect of the embodiments is a vehicle information processing system for using a reasoning algorism to reason out a recommendation appropriate for a recipient who receives the recommendation and for providing the recommendation obtained through the reasoning. The system comprises: a resource storage unit containing a plurality of different resources for calculation depending on the recommendation-condition, wherein the recommendation-condition is a condition on the recipient side who receives a recommendation; a resource determining unit for determining a resource for calculation corresponding to the recommendation-condition from the resources for calculation stored in the resource storage unit; a reasoning unit for reading out the resource for calculation determined by the resource determining unit from the resource storage unit and for obtaining a recommendation through reasoning that uses the read-out resource for calculation; and a recommending unit for providing the recommendation obtained by the reasoning unit to the recipient.

A plurality of different resources for calculation depending on the recommendation-condition such as the attribute of the recipient are stored, and a resource for calculation corresponding to the recommendation-condition is read out from these resources for calculation and applied to probabilistic reasoning. In this manner, an appropriate recommendation can be accurately obtained under the recommendation-condition at different times. The "resource for calculation" herein refers to a resource used in calculation of a reasoning algorithm. For example, it may be a knowledge base in the case of the expert system, or a neural network with many interconnected neuron models in the case of the neural network.

A vehicle information recommending device of the embodiments is a vehicle information recommending device for using a Bayesian network model to provide a probabilistically appropriate recommendation to a recipient who receives the recommendation, the recipient being an occupant. The device comprises: a model storage unit containing a plurality of different Bayesian network models depending on the recommendation-condition, wherein the recommendation-condition is a condition on the recipient side who receives a recommendation; a model determining unit for determining a model corresponding to the recommendation-condition as an application model from the models stored in the model storage unit; a reasoning unit for reading out the application model determined by the model determining unit from the model storage unit and for obtaining a recommendation through probabilistic reasoning that uses the read-out application model; and a recommending unit for providing the recommendation obtained by the reasoning unit to the recipient.

In this manner, an appropriate recommendation can be accurately obtained as in the case of the above-described vehicle information processing system. It is also possible to apply the features of the above-described vehicle information processing system to the vehicle information recommending device of the embodiments.

The vehicle information recommending device of the embodiments may be provided in a car.

In this manner, appropriate information likely to be accepted by the driver is recommended. Therefore, the need to repeatedly receive information is eliminated, and the burden on the driver who receives information is reduced. This contributes to safe driving.

A vehicle information processing method of the embodiments is a method for using a Bayesian network model to provide a probabilistically appropriate recommendation to a recipient who receives the recommendation, the recipient being an occupant. The method comprises: a model determining step of determining a model corresponding to the recommendation-condition as an application model from a plurality of different Bayesian network models depending on the recommendation-condition, wherein the recommendation-condition is a condition on the recipient side who receives a recommendation; a reasoning step of obtaining a recommendation through probabilistic reasoning that uses the application model determined in the model determining step; and a recommending step of providing the recommendation obtained in the reasoning step to the recipient.

In this manner, an appropriate recommendation can be accurately obtained as in the case of the above-described vehicle information processing system. It is also possible to apply the features of the above-described vehicle information processing system to the vehicle information processing method of the embodiments.

A program of the embodiments is a program for using a Bayesian network model to provide a probabilistically appropriate recommendation to a recipient who receives the recommendation, the recipient being an occupant. The program causes a computer to perform: a model determining step of determining a model corresponding to the recommendation-condition as an application model from a plurality of different Bayesian network models depending on the recommendation-condition, wherein the recommendation-condition is a condition on the recipient side who receives a recommendation; a reasoning step of obtaining a recommendation through probabilistic reasoning that uses the application model determined in the model determining step; and a recommending step of providing the recommendation obtained in the reasoning step to the recipient.

In this manner, an appropriate recommendation can be accurately obtained as in the case of the above-described vehicle information processing system. It is also possible to apply the features of the above-described vehicle information processing system to the program of the embodiments.

Now, the vehicle information processing system in the embodiments will be described below using the drawings. The following description adopts a system in which a content providing device in a vehicle provides songs appropriate for a user. However, objects recommended by the vehicle information processing system of the present invention are not limited to songs. For example, the vehicle information processing system of the present invention may be applied to a recommendation system for recommending restaurants or events appropriate for a user. The vehicle information processing system of the present invention is not limited to a system provided in a vehicle but may be applied to a system in which a personal computer at home or a mobile phone carried by a user provides a recommendation appropriate for the user.

FIG. 1 is a diagram showing a configuration of an information processing system 10 in an embodiment. The vehicle information processing system (hereafter referred to as the "information processing system") 10 includes a plurality of content providing devices 20, each being communicatively connected with a center device 50. A content providing device 20 is a device that selects songs appropriate for its user, who is an occupant of the vehicle, and that auto-plays the selected songs. The center device 50 is a device that aggregates data about user responses obtained by the content providing devices 20.

Figure 2:
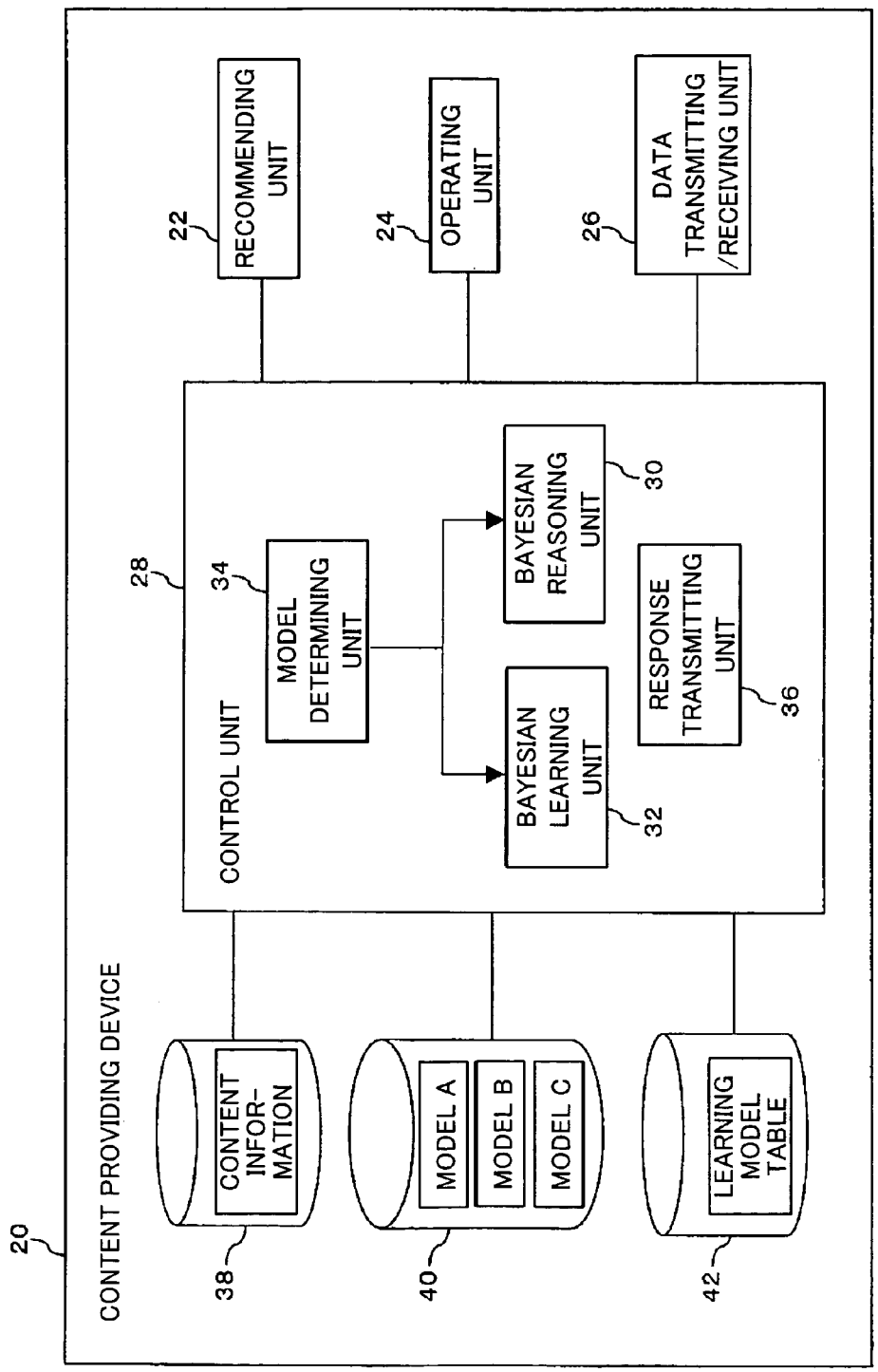
FIG. 2 is a diagram showing a configuration of a content providing device in the first embodiment.

FIG. 2 is a diagram showing a configuration of a content providing device 20. The content providing device 20 includes a recommending unit 22 for recommending content to the user, an operating unit 24 for receiving operations from the user, a data transmitting/receiving unit 26 for communicating with the center device 50 and a control unit 28 for controlling the entire content providing device 20. The content providing device 20 also includes a content information storage unit 38 containing content information, a model storage unit 40 containing Bayesian network models and a learning model table storage unit 42 containing information about learning models in association with application models.

The recommending unit 22 has a function of recommending content to the user. The hardware of the recommending unit 22 includes a speaker for outputting the sound of songs, and a display for displaying a song title, an artist name, and so forth.

The operating unit 24 has a function of receiving operations from the user. The operating unit 24 receives an operation for selecting an application model for use in probabilistic reasoning of content, and receives responses to the recommended content. The hardware of the operating unit 24 includes buttons for instructing start, stop, fast-forward, etc. of the sound, and a volume control knob. For selection of an application model, candidate models are displayed on the recommending unit 22 so that the application model is selected with the fast-forward and rewind buttons. For reception of a response, information about operations on the buttons and the volume control knob is obtained to judge the response.

The data transmitting/receiving unit 26 has a function of wirelessly communicating with the center device 50. The content providing device 20 and the center device 50 can communicate with each other via, for example, a mobile phone network.

The content information storage unit 38 contains a plurality of content information items potentially recommended to the user. The content providing device 20 selects content appropriate for the user from the content stored in the content information storage unit 38 and provides the selected content to the user.

FIG. 3 is a diagram showing exemplary content information stored in the content information storage unit 38. As shown in FIG. 3, the content information storage unit 38 contains song titles, genres, rankings, and song data. Although the description of the present embodiments assumes as an example that the song data is stored in the content information storage unit 38, the content providing device 20 may not necessarily have the song data. For example, once songs to be recommended to the user are selected, data about the selected songs may be obtained via a network or from an external disk.

Referring back to FIG. 2, the model storage unit 40 has a function of storing models used for obtaining the content appropriate for the user. The model storage unit 40 contains three models, i.e., a model A, a model B, and a model C, depending on the recommendation-condition. The recommendation-condition refers to a condition on the recipient side who receives a recommendation. Each model stored in the model storage unit 40 is suitable for performing the probabilistic reasoning under the corresponding recommendation-condition. The present embodiments assumes that the recommendation-condition is the attribute of users in a vehicle, wherein the model A is for the father, the model B is for the mother, and the model C is for the family. Therefore, for example, the model A is suitable for obtaining content to be recommended to the father through the probabilistic reasoning. The models A to C are all general models before learning is performed in the content providing device 20. Applying the models A to C under the corresponding recommendation-condition and performing learning using responses thereto makes the models specialized for the recommendation-condition. Although the model storage unit 40 herein contains three models, the number of the stored models is not limited to three.

Figure 4:
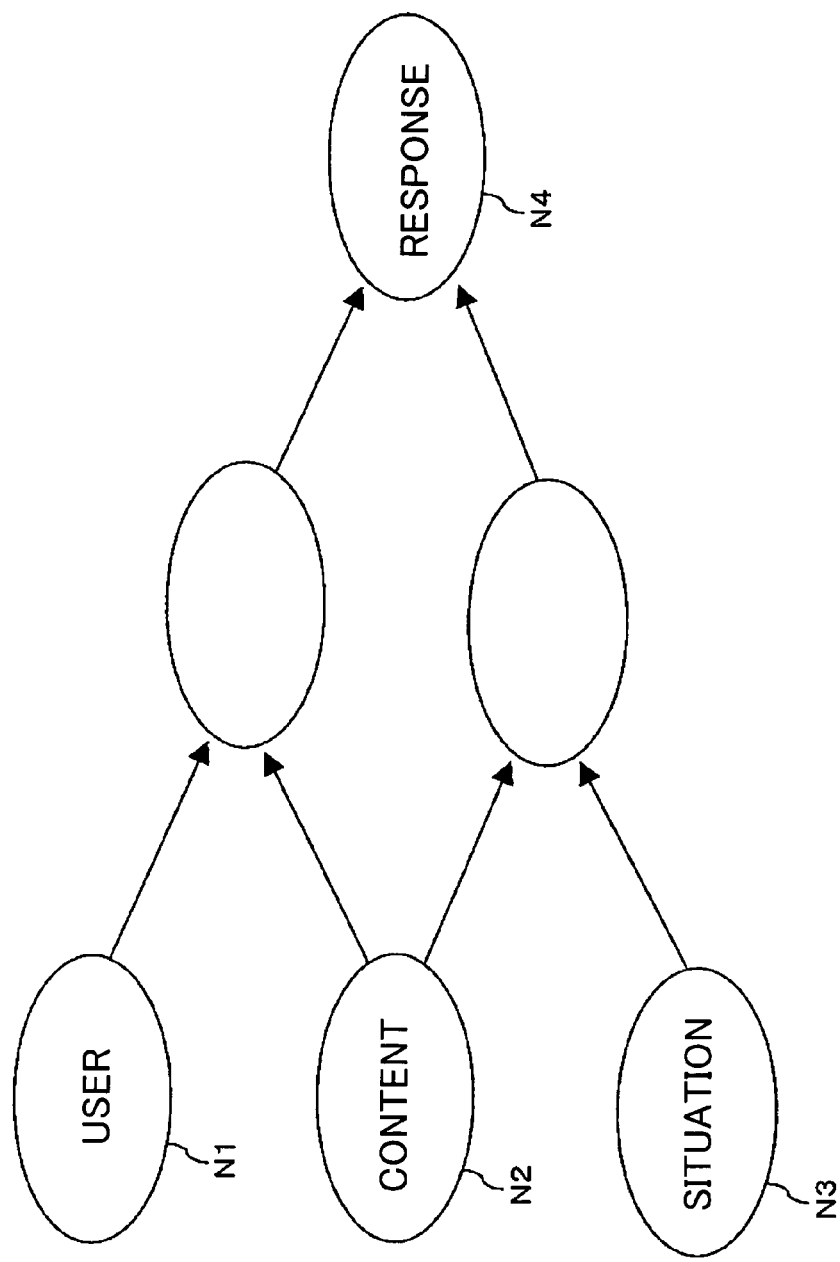
FIG. 4 is a diagram showing an exemplary model stored in a model storage unit in the first embodiment.

FIG. 4 is a diagram showing an exemplary model stored in the model storage unit 40. As shown in FIG. 4, the Bayesian network model has a node N1 for a user, a node N2 for content, node N3 for a situation, and a node N4 for a response, connected with each other via another node by links indicating dependencies of the conditional probability. The response node N4 is a node for predicting a user response.

Now, the control unit 28 in the content providing device 20 will be described. In the control unit 28 shown in FIG. 2, a Bayesian reasoning unit 30 has a function of using a model stored in the model storage unit 40 to obtain the content appropriate for the user through the probabilistic reasoning. The Bayesian reasoning unit 30 reads out a model determined by a model determining unit 34 from the model storage unit 40 and uses the read-out model to perform the reasoning. The reasoning method implemented by the Bayesian reasoning unit 30 will be described using the model shown in FIG. 4. First, the Bayesian reasoning unit 30 sets values for the nodes N1 to N3. Information such as the user's age, sex, and musical preference, for example, is set for the user node N1. A content information item that is read out from the content information storage unit 38 is set for the content node N2. Information such as the time and the running location, for example, is set for the situation node N3. The Bayesian reasoning unit 30 determines the score of the response node N4 based on probability propagation from the nodes N1 to N3. The Bayesian reasoning unit 30 sequentially reads out content information items from the content information storage unit 38 and repeats the above-described operations to determine the score of each content item. The Bayesian reasoning unit 30 selects content appropriate for the user based on the determined scores.

In the control unit 28, a Bayesian learning unit 32 has a function of learning models using user responses. A user response refers to user-input information about whether or not to accept content, and it is observed information. The Bayesian learning unit 32 modifies the dependencies of the conditional probability in the models based on the responses and updates the models to models that allow more accurately obtaining the content appropriate for the user's preference under the recommendation-condition corresponding to the models. That is, the models stored in the model storage unit 40 are updated to specialized models suitable for the probabilistic reasoning under the corresponding recommendation-condition.

In the control unit 28, the model determining unit 34 has a function of determining a model used for the reasoning based on model selection information that is input via the operating unit 24, and a function of determining models to be learned referring to a learning model table stored in the learning model table storage unit 42.

FIG. 5 is a diagram showing exemplary data stored in the learning model table storage unit 42. The learning model table storage unit 42 contains the association between application models and learning models. An application model is a model applied to the probabilistic reasoning for obtaining content appropriate for the user. A learning model is a model to be learned using responses to the recommended content. For instance, in the example shown in FIG. 5, if the model A is the application model, the models A and C are the learning models. Therefore, responses to content obtained using the model A for the father are used to learn the model A for the father and the model C for the family. Since the father's responses to the content obtained using the model A for the father are reflected in the model A, the model A becomes a model that allows more appropriately obtaining the content suitable for the father's preference. The father's responses also affect the model C for the family because the father is a member of the family. Therefore, the model C for the family is also set as a learning model.

In the control unit 28, a response transmitting unit 36 has a function of transmitting responses received via the operating unit 24 to the center device 50. The response transmitting unit 36 transmits all received responses. In the example of the present embodiments, all responses of the father, mother, and family are transmitted.

Figure 6:
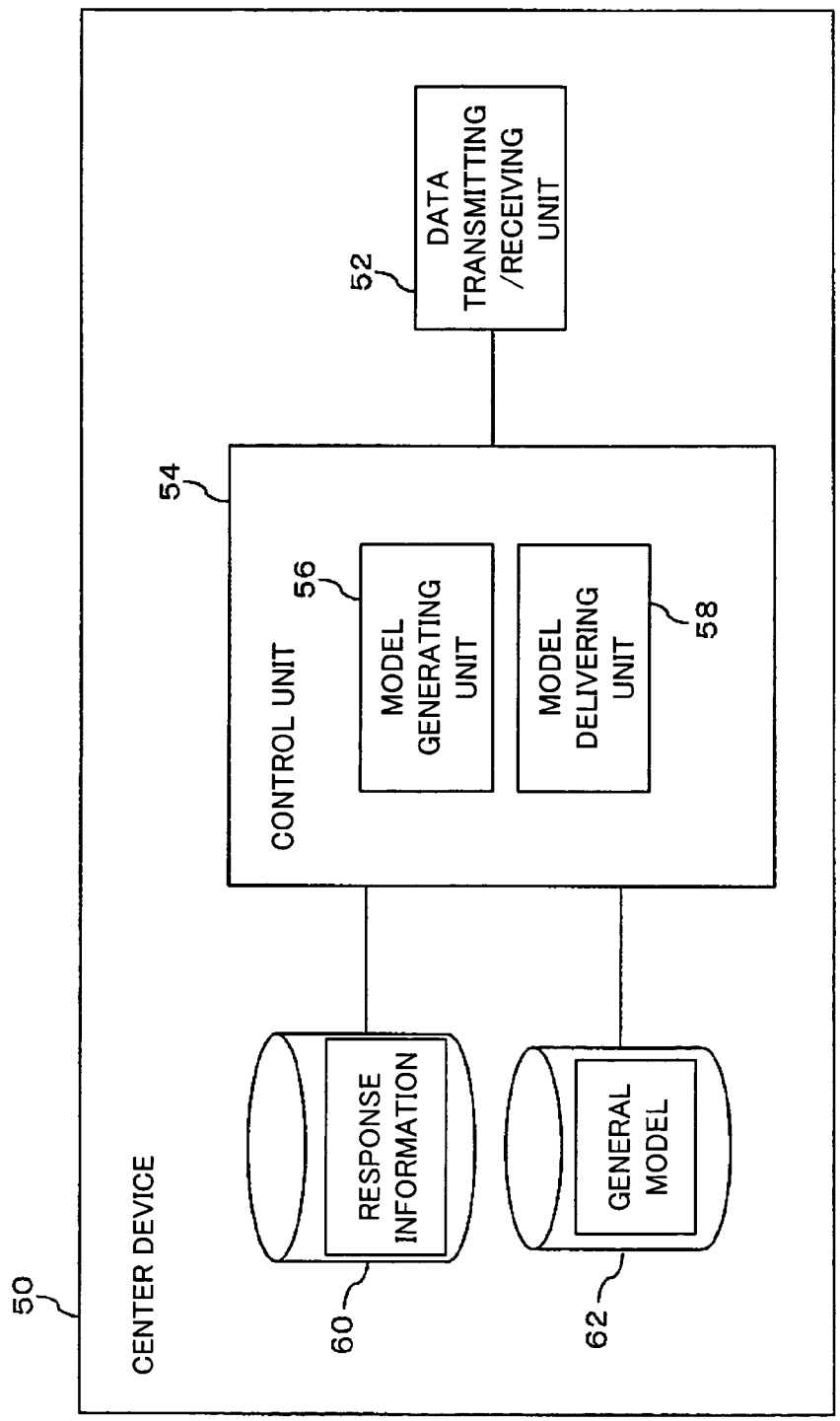
FIG. 6 is a diagram showing a configuration of a center device in the first embodiment.

FIG. 6 is a diagram showing a configuration of the center device 50. The center device 50 includes a data transmitting/receiving unit 52 for communicating with the content providing devices 20 and a control unit 54 for controlling the entire device. The center device 50 also includes a response information storage unit 60 for accumulating responses transmitted from the content providing devices 20 and a general model storage unit 62 for containing a general model generated based on the responses accumulated in the response information storage unit 60.

The response information storage unit 60 has a function of accumulating information about responses transmitted from the content providing devices 20. The response information transmitted from a plurality of content providing devices 20 is aggregated in the response information storage unit 60.

In the control unit 54, a model generating unit 56 has a function of reading out the response information accumulated in the response information storage unit 60 and generating a Bayesian network model based on the read-out response information. The model generated here is a general model without a specific recommendation-condition for content. The model generating unit 56 has a function of storing the generated model in the general model storage unit 62.

In the control unit 54, a model delivering unit 58 has a function of reading out the general model stored in the general model storage unit 62 and delivering the read-out model to the content providing devices 20. The model delivering unit 58 may deliver the general model either at the request of the content providing devices 20 or on a regular basis.

Now, operations of the information processing system 10 in a first embodiment will be described.

Figure 7:
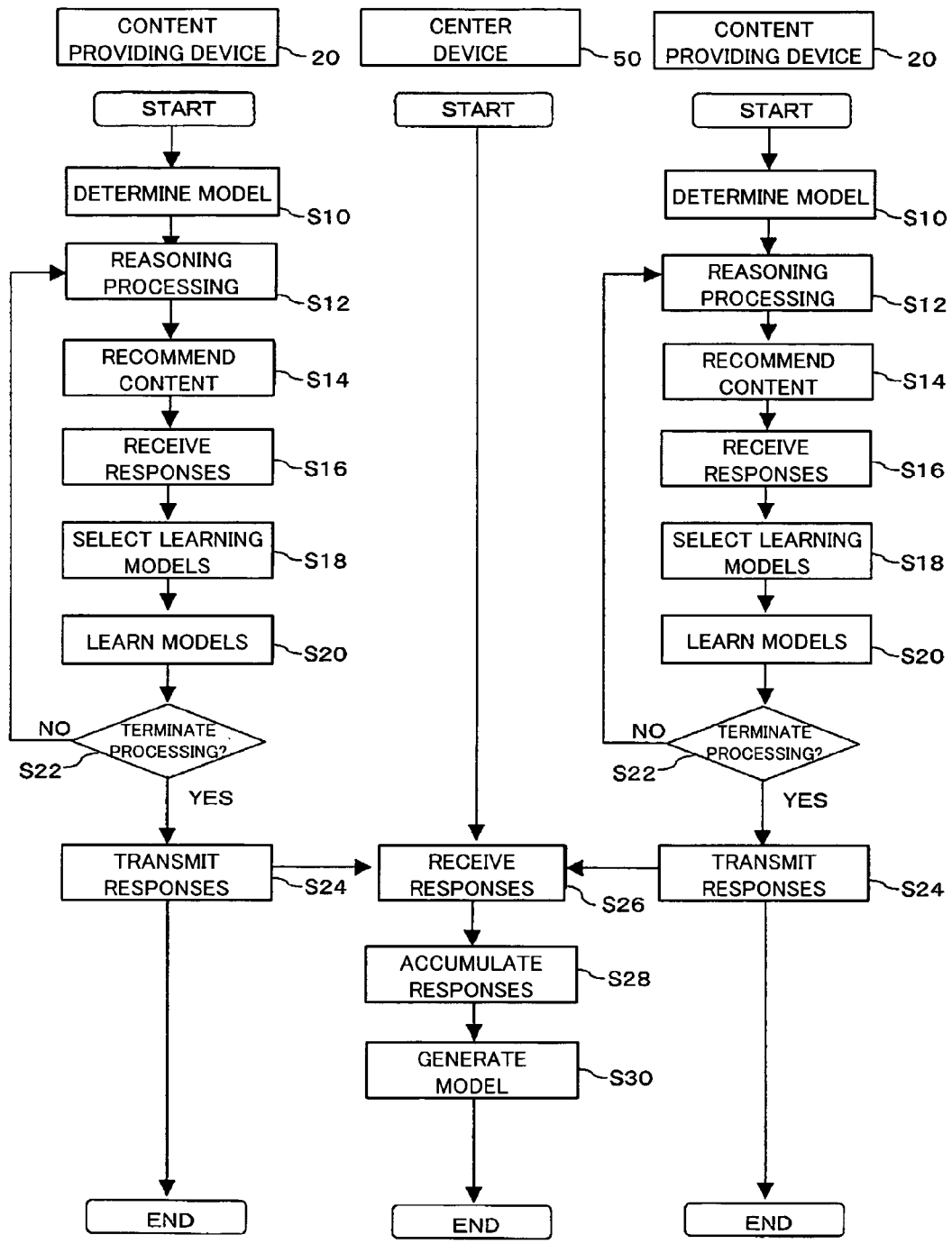
FIG. 7 is a diagram showing operations of the information processing system in the first embodiment.

FIG. 7 is a diagram showing operations of the information processing system 10 in the first embodiment. First, in order to auto-play songs, each content providing device 20 determines a model for obtaining content appropriate for the user (S10). The content providing device 20 determines one model out of the three models stored in the model storage unit 40. In this embodiment, the content providing device 20 displays on the recommending unit 22 information about the models stored in the model storage unit 40 receives a selection of a model via the operating unit 24. Here, it is assumed that a selection of the model A for the father is received via the operating unit 24. The model determining unit 34 is informed of the information received via the operating unit 24 and determines the model for obtaining the content.

Then, the Bayesian reasoning unit 30 in the content providing device 20 performs the probabilistic reasoning using the determined model A and obtains the content appropriate for the user (S12). The content information items sequentially read out from the content information storage unit 38 are set for the node N2 of the model A, and the score of the response node N4 is calculated for each content item based on the probability propagation from the nodes N1 to N3. The content with the highest response score is selected as the content to be recommended. The Bayesian reasoning unit 30 may obtain a song with the highest score or a plurality of songs with a score above a certain value. If the auto-play is to be performed for a long duration, several songs are preferably selected to fit to the auto-play duration. The content providing device 20 recommends the content to the user by playing the obtained songs (S14).

Then, the Bayesian learning unit 32 in the content providing device 20 receives responses from the user (S16). The Bayesian learning unit 32 receives the responses from the user via the operating unit 24 and judges the responses from the type of the operations. For example, if a song being played is stopped, the response indicates that the recommended content is not accepted, whereas if a song being played is listened to through or if the volume is increased, the response indicates that the recommended content is accepted.

Then, the model determining unit 34 in the content providing device 20 selects learning models (S18). In the present case, since the model A for the father is applied to the reasoning, the models A and C are selected as the learning models from the information in the learning model table storage unit 42 shown in FIG. 5. The Bayesian learning unit 32 in the content providing device 20 learns the models A and C using the user responses received via the operating unit 24 (S20).

Then, the content providing device 20 determines whether or not to terminate the content recommendation processing (S22). For example, the determination whether or not to terminate the content recommendation processing may be made based on whether or not the vehicle has reached the destination. If it is determined that the content recommendation processing is not terminated, the operation of the content providing device 20 transits to step S12 to determine the next song to be played through the probabilistic reasoning.

If it is determined that the content recommendation processing is terminated, the response transmitting unit 36 in the content providing device 20 transmits the user responses received via the operating unit 24 to the center device 50 (S24). The responses transmitted here include information about the user responses themselves, as well as information about the user attribute, situation, and content attribute.

The center device 50 receives the responses transmitted from the content providing device 20 (S26) and accumulates the received responses in the response information storage unit 60. The center device 50 accumulates the responses transmitted from a plurality of content providing devices 20.

After a certain amount of response information is accumulated in the response information storage unit 60, the model generating unit 56 in the center device 50 reads out the response information from the response information storage unit 60 and generates a Bayesian network model using the read-out response information (S30). The model generated here is a general model without a specific recommendation-condition. The model generating unit 56 stores the generated model in the general model storage unit 62. The model delivering unit 58 in the center device 50 delivers the general model stored in the general model storage unit 62 either at the request of the content providing device 20 or on a regular basis.

Thus, the information processing system 10 in the first embodiment has been described.

In the information processing system 10 of the first embodiment, each content providing device 20 contains a plurality of different models depending on the user attribute in the model storage unit 40. These models are suitable for obtaining content to be recommended to the user having the corresponding attribute through the probabilistic reasoning. The content providing device 20 reads out a model corresponding to the attribute of the user from the models stored in the model storage unit 40 and uses the read-out model to obtain the content to be recommend to the user through the probabilistic reasoning. Therefore, content highly satisfactory to the user can be obtained. That is, the information processing system 10 can accurately obtain the appropriate content. This allows reduction in the number of the user's reattempts to receive a content recommendation, thereby reducing the burden on the driver and contributing to safe driving.

The learning model table storage unit 42 contains the association between the application models and models to be learned using responses to the content reasoned out by the respective application models. Since the Bayesian learning unit 32 in the content providing device 20 refers to the learning model table storage unit 42 to determine the learning models, it can learn the models affected by the responses. Since the learning model table storage unit 42 contains information about a plurality of learning models for each application model, a plurality of models can be efficiently learned based on one response.

The center device 50 aggregates the response information obtained in each content providing device 20 in the response information storage unit 60 and generates the general model using the aggregated response information. Therefore, the general model reflecting the latest behavior can be obtained. The center device 50 delivers the general model to the content providing device 20, so that the content providing device 20 can perform the probabilistic reasoning using the general model.

Now, the information processing system 10 in a second embodiment of the present invention will be described. The information processing system 10 in the second embodiment is similar to the information processing system 10 in the first embodiment in its basic configuration, except for the information stored in the learning model table storage unit 42.

FIG. 8 is a diagram showing exemplary data stored in the learning model table storage unit 42 in the second embodiment. As shown in FIG. 8, the learning model table storage unit 42 contains information about the application models and the learning models, as well as reflection parameters. A reflection parameter indicates the degree to which the user responses are reflected in a learning model. The reflection parameters can be used to adjust the degree to which the responses are reflected in the respective models. For example, if the application model is the model A for the father, the degree to which the learning using responses to this model is reflected in the model C for the family is "0.2", whereas the degree to which responses obtained using the model C is reflected in the model C is "1."

Figure 9:
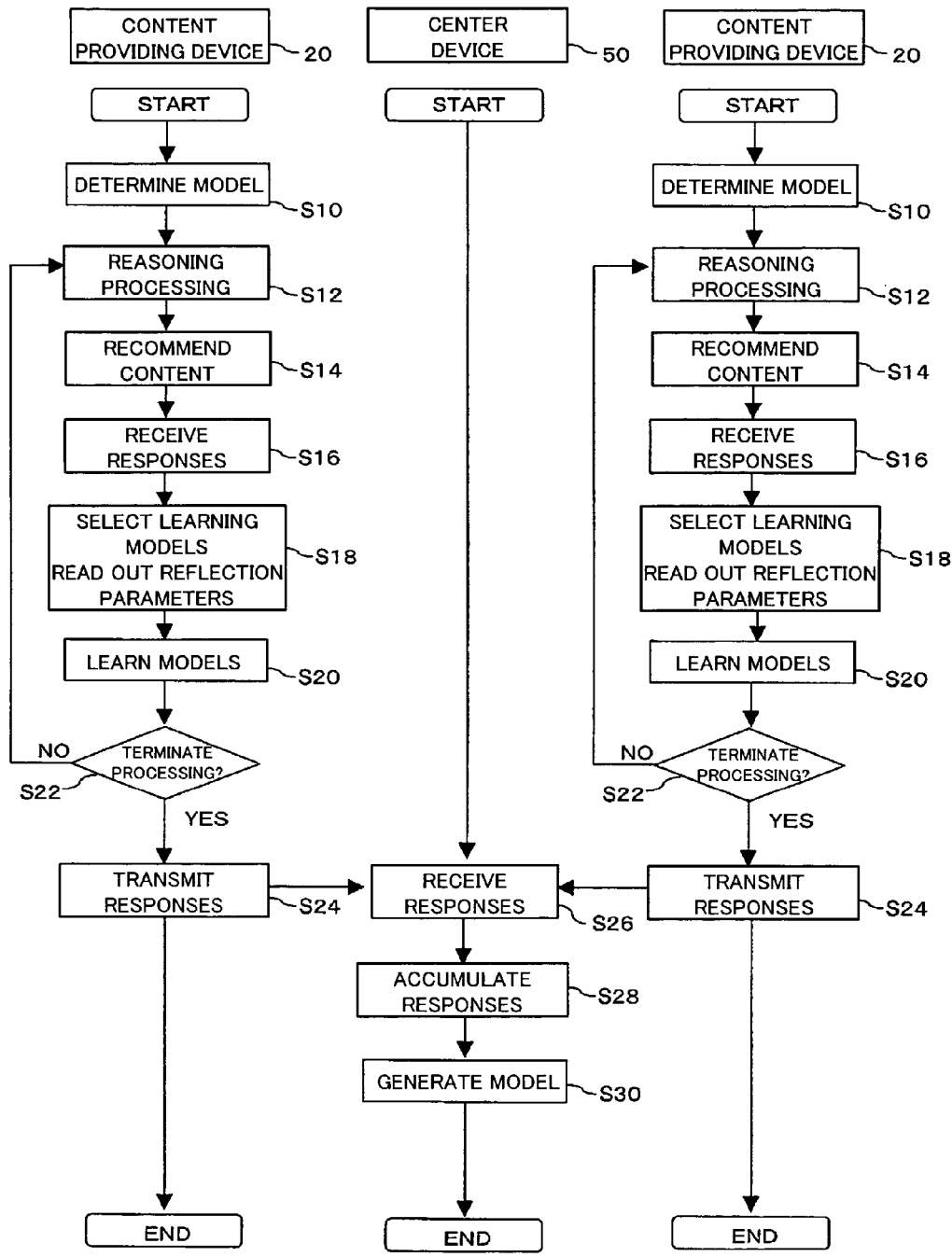
FIG. 9 is a diagram showing operations of the information processing system in the second embodiment.

FIG. 9 is a diagram showing operations of the information processing system 10 in the second embodiment. The information processing system 10 in the second embodiment is similar to the first information processing system 10 in its basic operations. However, the operations in the second embodiment are different from those in the first embodiment in that the reflection parameters are also read out when the learning models are selected from the learning model table storage unit 42 (S18). The Bayesian learning unit 32 in each content providing device 20 learns the models using the read-out reflection parameters (S20).

In the information processing system 10 of the second embodiment, appropriate learning is possible by learning the models using the parameters indicating the degree to which the responses are reflected in the models. For example, if the contributions of the father and mother to the model C for the family are different, the degree of reflection of the responses obtained with the models A and B may be set according to the respective amounts of contribution, as shown in FIG. 8. In this manner, the model C can be appropriately learned.

Now, the information processing system 10 in a third embodiment of the present invention will be described. The information processing system 10 in the third embodiment is similar to the information processing system 10 in the first embodiment in its basic configuration. However, it is different in that the center device 50 generates learning data for bringing models closer to the general model based on the response information aggregated from a plurality of content providing devices 20, and delivers the learning data to the content providing devices 20. The content providing devices 20 learn models stored in the model storage unit 40 based on the learning data transmitted from the center device 50.

Figure 10:
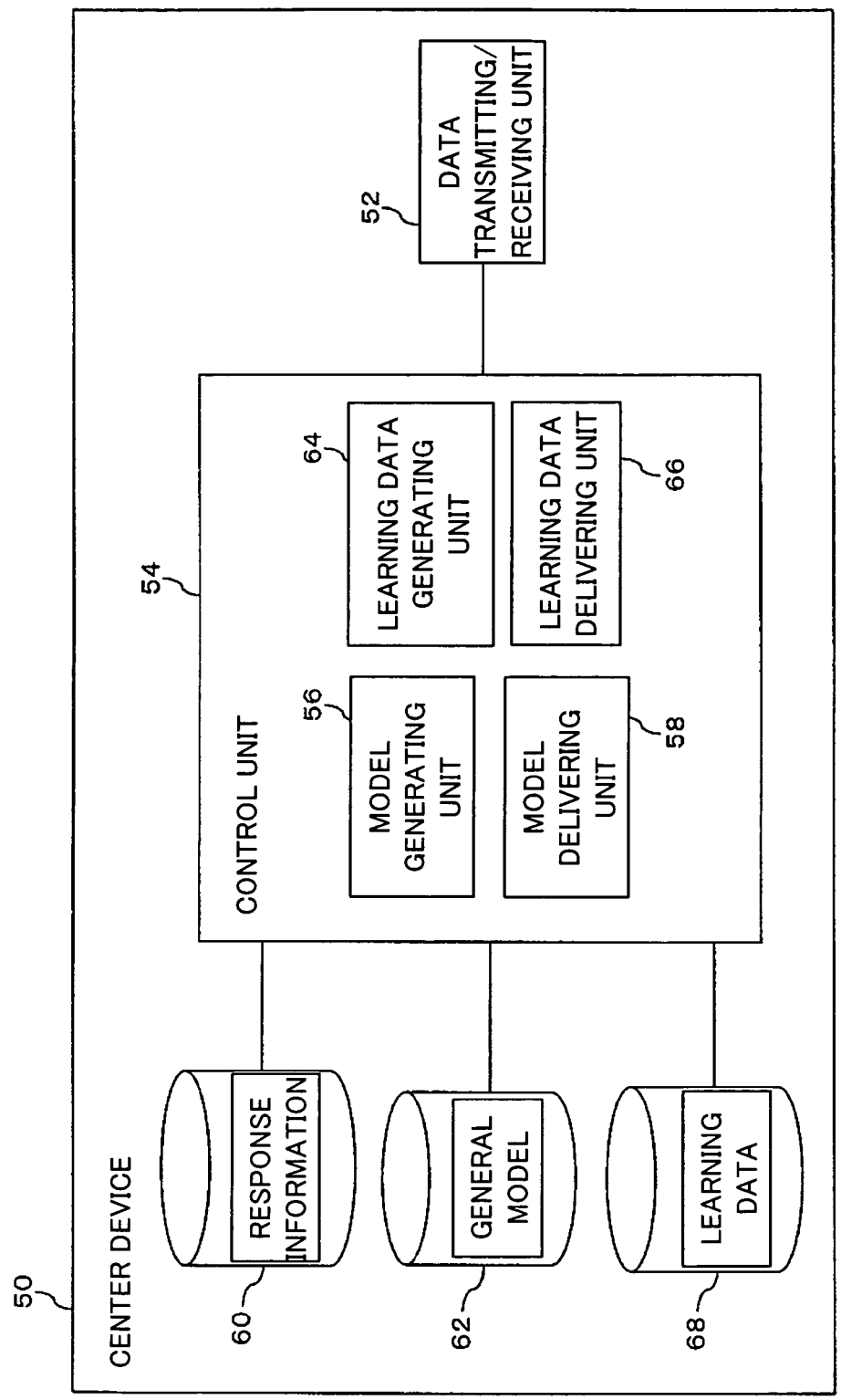
FIG. 10 is a diagram showing a configuration of the center device in a third embodiment.

FIG. 10 is a diagram showing a configuration of the center device 50 in the information processing system 10 in the third embodiment. In addition to the configuration of the center device 50 in the first embodiment, the center device 50 in the third embodiment includes a learning data generating unit 64, a learning data delivering unit 66, and a learning data storage unit 68. The learning data generating unit 64 has a function of generating the learning data for bringing the learning models closer to the general model based on the response information stored in the response information storage unit 60. The learning data storage unit 68 has a function of storing the learning data generated in the learning data generating unit 64. The learning data delivering unit 66 has a function of reading out the learning data stored in the learning data storage unit 68 and delivering the learning data to the content providing devices 20.

Figure 11:
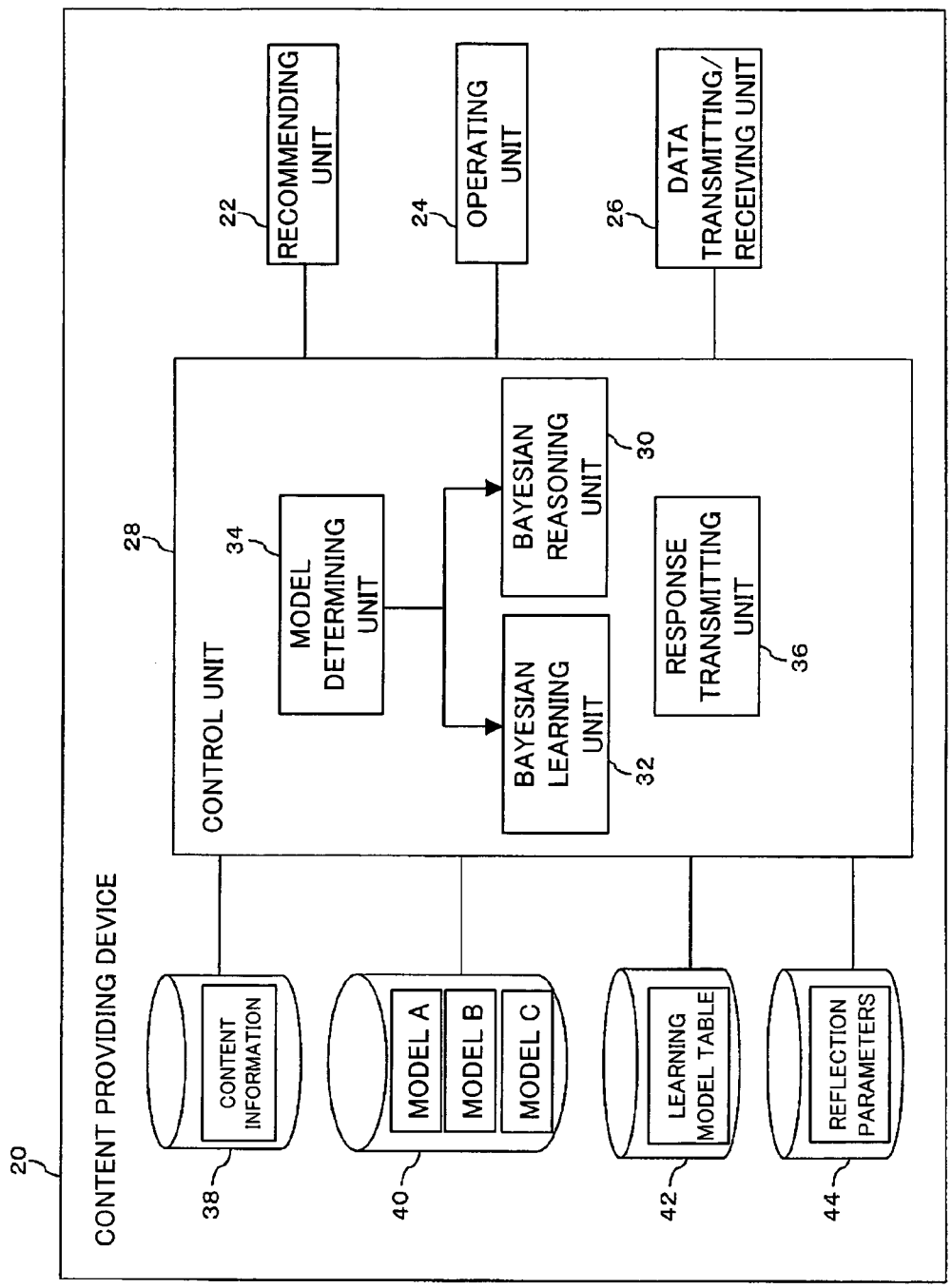
FIG. 11 is a diagram showing a configuration of the content providing device in the third embodiment.

FIG. 11 is a diagram showing a configuration of the content providing device 20 in the information processing system 10 in the third embodiment. In addition to the configuration of the content providing device 20 in the first embodiment, the content providing device 20 in the third embodiment includes a reflection parameter storage unit 44 containing reflection parameters indicating the degree to which the learning data transmitted from the center device 50 is reflected in the models. A reflection parameter defines the degree to which a model stored in the model storage unit 40 is brought closer to the general model. The Bayesian learning unit 32 in the control unit 28 uses the reflection parameters read out from the reflection parameter storage unit 44 to determine the degree to which the learning data is reflected in the models and learns the models according to the determined degree. For example, the Bayesian learning unit 32 performs learning using the learning data as many times as set by a reflection parameter. A larger value of reflection parameter results in a larger number of times of learning, thereby a greater degree of reflection of the learning data in the model.

Figure 12:
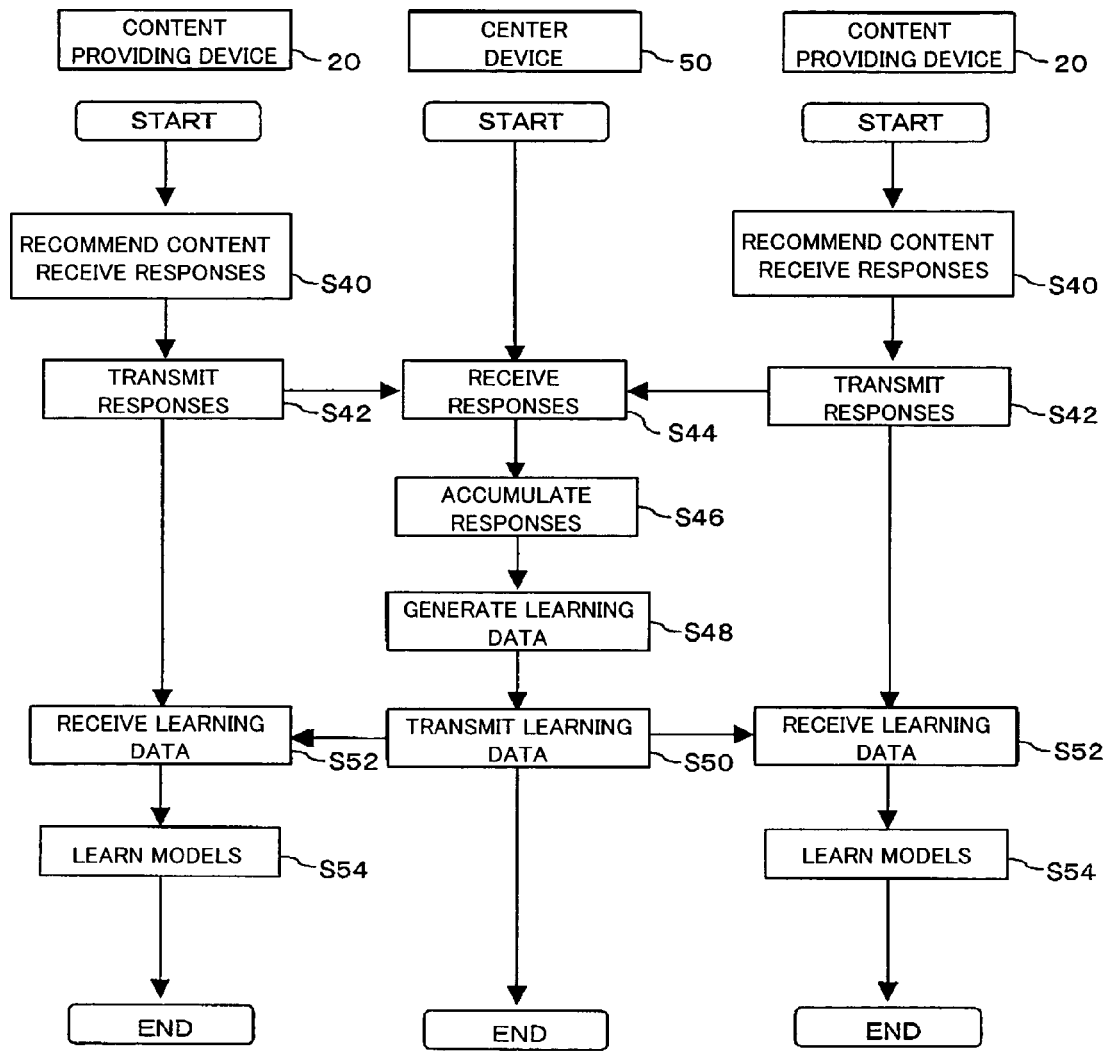
FIG. 12 is a diagram showing operations of the information processing system in the third embodiment.

FIG. 12 is a diagram showing operations of the information processing system 10 in the third embodiment. As in the case of the first or second embodiment, each content providing device 20 recommends content to the user and receives responses from the user (S40). Then, the content providing device 20 transmits the received responses to the center device 50 (S42). The center device 50 receives the responses via the data transmitting/receiving unit 52 (S44) and accumulates the received responses in the response information storage unit 60 (S46).

The learning data generating unit 64 in the center device 50 reads out the responses accumulated in the response information storage unit 60, generates the learning data using the read-out responses, and stores the generated learning data in the learning data storage unit 68 (S48). The learning data delivering unit 66 in the center device 50 delivers the learning data stored in the learning data storage unit 68 to the content providing device 20 (S50).

The content providing device 20 obtains the learning data by receiving the learning data transmitted from the center device 50 (S52). The Bayesian learning unit 32 in the content providing device 20 uses the received learning data to learn models stored in the model storage unit 40 (S54). At this point, the Bayesian learning unit 32 reads out the reflection parameters from the reflection parameter storage unit 44 and causes the learning data to be reflected based on the degree defined by the read-out reflection parameters.

In the third embodiment, the learning data for learning models is generated based on the response information aggregated from the content providing devices 20, to which the generated learning data is then delivered. The content providing devices 20 use the delivered learning data to learn models. Therefore, the specificity of the models depending on the recommendation-condition can be reduced, and the specialized models suitable for the probabilistic reasoning under the recommendation-condition can be brought closer to the general model.

Thus, the information processing system of the present invention has been described in detail with respect to the embodiments. However, the present invention is not limited to the described embodiments.

The above embodiments have assumed that the content providing device 20 includes the Bayesian reasoning unit 30 and the Bayesian learning unit 32, and the content providing device 20 reasons out the content appropriate for the user and learns the models. Alternatively, the center device 50 may include the Bayesian reasoning unit 30 and the Bayesian learning unit 32.

Figure 13:
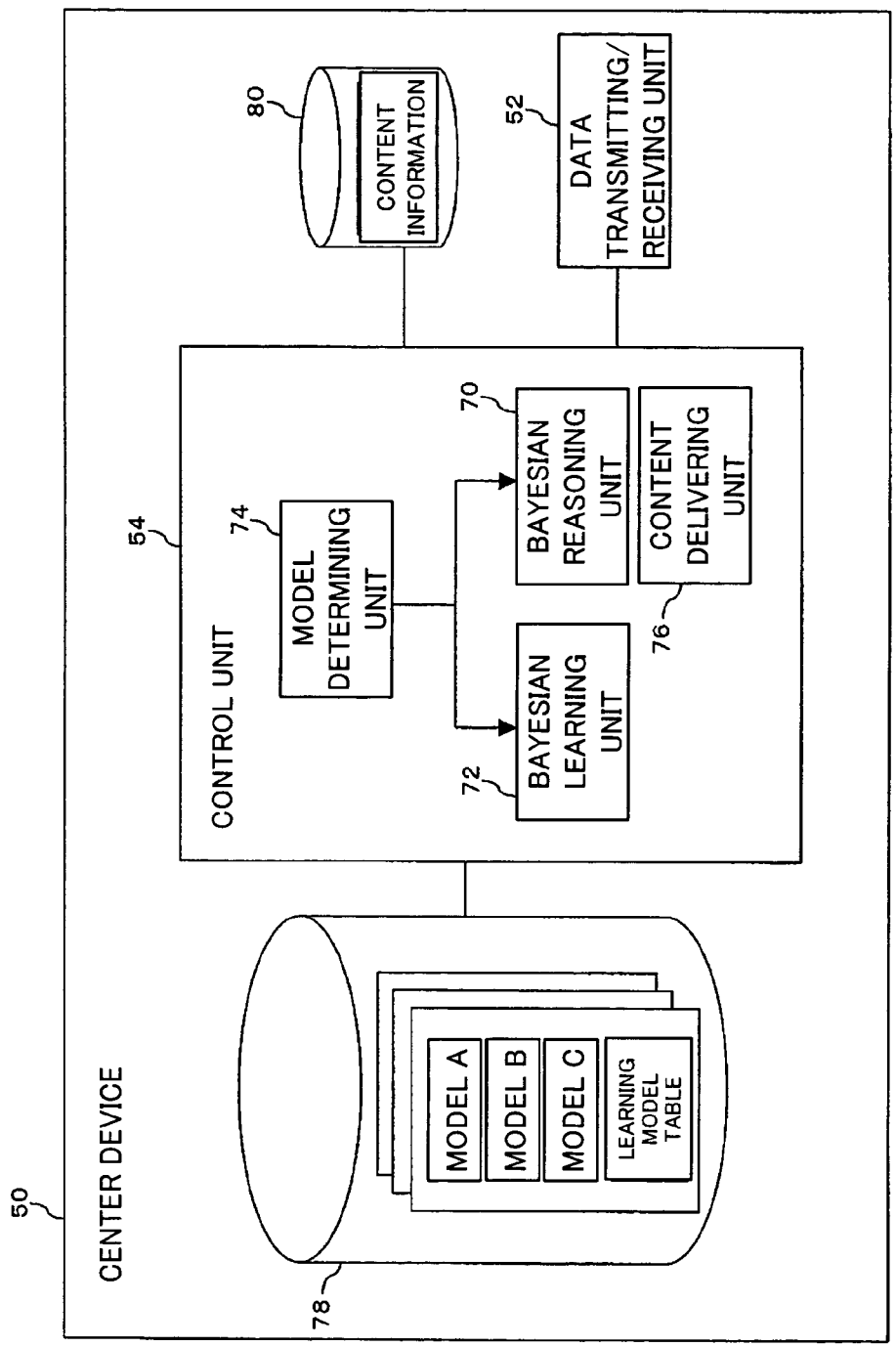
FIG. 13 is a diagram showing a configuration of the center device according to a variation.

FIG. 13 is a diagram showing a configuration of the center device 50 including the Bayesian reasoning unit 30 and the Bayesian learning unit 32. As shown in FIG. 13, the center device 50 includes a model storage unit 78 containing models used for selecting content to be recommended, and a content information storage unit 80 containing content information. The model storage unit 78 contains a plurality of models used in each content providing device 20 and a learning model table indicating learning models. The control unit 54 in the center device 50 includes a model determining unit 74 for determining a model applied to the probabilistic reasoning, a Bayesian reasoning unit 70 for selecting content to be recommended, a content delivering unit 76 for delivering the selected content, and a Bayesian learning unit 72 for learning models. In the information processing system including this center device 50, each content providing unit 20 transmits model selection information received via the operating unit 24 to the center device 50. The center device 50 uses the model indicated by the selection information to obtain the content appropriate for the user, and delivers the obtained content to the content providing device 20. The content providing device 20 transmits received responses to the center device 50, which then learns the models. In this manner, the information processing system including the content providing devices 20 with a simple configuration can be realized.

The above embodiments have been described for the case in which the information processing system 10 includes the center device 50. However, the information processing system 10 may not necessarily include the center device 50. Rather, the information processing system of the present invention may be implemented only with the content providing devices 20 shown in FIG. 2.

The above embodiments have been described by taking one of user attributes as exemplary recommendation-condition corresponding to a plurality of models stored in the model storage unit 40. However, other user attributes, such as the age, sex, and occupation, may be used as the recommendation-condition. The recommendation-condition is not limited to the user attributes but may be, for example, the situation at the time of recommendation. The situation at the time of recommendation may be the day of a week when the recommendation is received, the time of a day when the recommendation is received, the state of mind at the time the recommendation is received, and so forth.

Although the above embodiments have been described by taking songs as an exemplary recommendation, the recommendation is not limited to songs. For example, the recommendation may be the genre, artist name, and so forth. If the amount of the content stored in the content information storage unit 38 is large, the genre may be obtained as a recommendation, for example, and the content information may be narrowed down by the obtained genre.

In the above-described embodiments, the method of determining a model for obtaining the content to be recommended involves the case in which the user selects the model. However, the model determination method is not limited to the method involving user selection. For example, the content providing device 20 may automatically determine the model by detecting the user from information about a key used by the user to start the vehicle.

The above embodiments have been described for the case in which different models are used depending on the attribute such as the father and the mother, so that each model is specialized. However, the models may not be generated based on explicit criteria. In that case, probabilistic reasoning using a select-model may be used to determine the model to be applied to the reasoning. That is, a select-model for determining the model to be applied to the reasoning is stored in a storage unit to be ready for use. A plurality of observed variables such as user attributes and the current situation are input to the select-model read out from the storage unit, and the model to be applied to the reasoning is determined through the probabilistic reasoning. In this manner, the model can be selected based on a combination of various attributes and situations, rather than based on an explicit variable such as an attribute or the situation. This allows accurate recommendation. Since the model selected in this manner is updated to a specialized model by learning, a model that allows more accurate recommendation can be generated. In addition, since the select-model is also updated by learning, a more appropriate model can be selected and the accuracy of the reasoning can be increased.

The above embodiments have been described for the case in which the model storage unit 40 contains three models of A to C, out of which the model to be used is determined. However, it is also possible to generate a new model. For example, to generate a model for a child, the content providing device 20 receives the general model from the center device 50 and stores the received general model as a model D in the model storage unit 40. Content to be recommended is obtained through the probabilistic reasoning using the model D, and responses from the child to the content are used to learn the model D. By repeating the learning of the model D several times, a model that allows reasoning of content appropriate for the child's preference is generated.

The information processing system of the present invention can be realized by causing a computer to execute a program having modules implementing the components of the information processing system in the above-described embodiments. Such a program is also included in the scope of the present invention.

It is to be understood that while the preferred embodiments of the present invention conceivable at present have been described, many variations may be made thereto. The appended claims are intended to cover all such variations that fall within the true spirit and scope of the present invention.

INDUSTRIAL APPLICABILITY

The present invention is useful as a recommendation system and so forth for using a Bayesian network model to provide a probabilistically appropriate recommendation.

The invention claimed is:

1. A vehicle information processing system for using a Bayesian network model to provide a probabilistically appropriate recommendation of media content to a recipient who receives the recommendation, the recipient being an occupant, the vehicle information processing apparatus comprising:
   a model storage unit storing a plurality of different Bayesian network models corresponding to a plurality of recipients, the Bayesian network models providing probabilistically appropriate recommendations of media content to the recipients based on recommendation conditions;
   a model selecting unit for selecting a first Bayesian network model from the stored Bayesian network models based on a recommendation condition associated with the recipient;
   a reasoning unit for reading the first Bayesian network model from the model storage unit, and for obtaining a recommendation of media content using probabilistic reasoning associated with the first Bayesian network model;
   a recommendation unit for providing the recommendation of media content to the recipient;
   a response receiving unit for receiving a response from the recipient in response to the recommendation of media content;
   a learning model information storage unit storing information associating learning models with corresponding Bayesian network models of the stored Bayesian network models; and
   a model learning unit for:
      identifying learning models associated with the first Bayesian network model based on the stored learning model information;
      learning the identified learning models based on the received response; and
      updating the identified learning models by specializing the identified learning models for the recommendation condition associated with the recipient,
   wherein the identified learning models include at least the first Bayesian network model and a second Bayesian network model, different from the first Bayesian network model, influenced by a result of the probabilistic reasoning associated with the first Bayesian network model.

2. The vehicle information processing system according to claim 1, wherein
   the learning model information storage unit contains reflection parameters indicating a degree to which the response is reflected in the learning of the learning models, wherein each reflection parameter is set for each of a plurality of the learning models, and the model learning unit performs learning processing such that a reflection parameter associated with a learning model is read from the learning model information storage unit and the response is reflected in the learning model to the degree according to the read reflection parameter.

3. A vehicle information processing system for using a Bayesian network model to provide a probabilistically appropriate recommendation of media content to a recipient who receives the recommendation, the recipient being an occupant, the vehicle information processing apparatus comprising:

a model storage unit storing a plurality of different Bayesian network models corresponding to a plurality of recipients, the Bayesian network models providing probabilistically appropriate recommendations of media content to the recipients based on recommendation conditions;

a model selecting unit for selecting a Bayesian network model from the stored Bayesian network models based on a recommendation condition associated with the recipient;

a reasoning unit for reading the selected Bayesian network model, and for obtaining a recommendation of media content using probabilistic reasoning associated with the read Bayesian network model;

a recommending unit for providing the recommendation of media content to the recipient;

a response receiving unit for receiving a response of the recipient in relation to the recommendation of media content;

a model learning unit for learning the stored Bayesian network models using the received response to specialize the learning models based on the recommendation condition associated with the recipient;

a learning data obtaining unit for obtaining learning data for generalizing the learning models; and a learning reflection parameter storage unit storing learning reflection parameters indicating respective degrees to which the learning data is reflected in the learning of the learning models, wherein the model learning unit uses the obtained learning data to learn the learning modes, such that the obtained learning data is reflected in learning of the learning models to the respective degrees indicated by the learning reflection parameters.

4. The vehicle information processing system according to any one of claims 1 and 3, further comprising:

information recommending devices, each having the recommending unit; and a center device communicatively connected with the information recommending devices, wherein the center device collects from each information recommending device the response received from the recipient when the recommendation of media content is provided.

5. The vehicle information processing system according to any one of claims 1 and 3, wherein the system is provided in a car.

* * * * *

UNITED STATES PATENT AND TRADEMARK OFFICE
CERTIFICATE OF CORRECTION

| | | |
|---|---|---|
| PATENT NO. | : 7,797,266 B2 | Page 1 of 1 |
| APPLICATION NO. | : 10/593065 | |
| DATED | : September 14, 2010 | |
| INVENTOR(S) | : Nobuhiro Mizuno et al. | |

It is certified that error appears in the above-identified patent and that said Letters Patent is hereby corrected as shown below:

Title page, item (73),

--Assignee:  Denso IT Laboratory, Inc., Tokyo (JP)-- should read

--Assignees:  Denso IT Laboratory, Inc., Tokyo (JP); and
National Institute of Advanced Industrial Science and Technology, Tokyo, (JP)--.

Signed and Sealed this
Fifteenth Day of March, 2011

David J. Kappos
*Director of the United States Patent and Trademark Office*